United States Patent [19]
Fuglevand et al.

[11] Patent Number: 6,096,449
[45] Date of Patent: Aug. 1, 2000

[54] FUEL CELL AND METHOD FOR CONTROLLING SAME

[75] Inventors: William A. Fuglevand; Peter D. DeVries; Greg A. Lloyd; David R. Lott; John P. Scartozzi, all of Spokane, Wash.

[73] Assignee: Avista Labs, Spokane, Wash.

[21] Appl. No.: 09/108,667

[22] Filed: Jul. 1, 1998

Related U.S. Application Data

[63] Continuation-in-part of application No. 08/979,853, Nov. 20, 1997.

[51] Int. Cl.[7] .................................................. H01M 8/04
[52] U.S. Cl. ................................................ 429/13; 429/23
[58] Field of Search .................................. 429/13, 22, 23

[56] References Cited

U.S. PATENT DOCUMENTS

| | | | |
|---|---|---|---|
| 2,852,554 | 9/1958 | England | 260/481 |
| 3,498,844 | 3/1970 | Sanderson | 136/86 |

(List continued on next page.)

FOREIGN PATENT DOCUMENTS

| | | |
|---|---|---|
| 25 51936 | 11/1975 | Germany . |
| 57-60670 | 4/1982 | Japan . |
| 57-80675 | 5/1982 | Japan . |
| 57-107570 | 7/1982 | Japan . |
| 2129237 | 5/1984 | United Kingdom . |
| WO94/15377 | 7/1994 | WIPO . |

OTHER PUBLICATIONS

Chul–Hawan et al., Journal of Polymer Science, vol. 34, pp. 2709–2714, (1996), (month unknown).

(List continued on next page.)

*Primary Examiner*—Stephen Kalafut
*Attorney, Agent, or Firm*—Wells, St. John, Roberts, Gregory & Matkin P.S.

[57] ABSTRACT

The present invention relates to an improved fuel cell and method for controlling same having an anode and a cathode which produces an electrical current having a given voltage and current output and which includes a controller electrically coupled with the fuel cell and which shunts the electrical current between the anode and the cathode of the fuel cell. The invention also discloses a method for controlling the fuel cell having an anode, a cathode and a given voltage and current output and which includes determining the voltage and current output of the fuel cell; and shunting the electrical current between the anode and cathode of the fuel cell under first and second operational conditions.

73 Claims, 4 Drawing Sheets

U.S. PATENT DOCUMENTS

| | | | |
|---|---|---|---|
| 3,507,702 | 4/1970 | Sanderson | 136/86 |
| 3,528,858 | 9/1970 | Hodgdon et al. | 136/86 |
| 3,623,913 | 11/1971 | Adlhart et al. | 136/86 |
| 3,808,534 | 4/1974 | Summers et al. | 340/249 |
| 3,823,358 | 7/1974 | Rey | 320/3 |
| 3,964,930 | 6/1976 | Reiser | 136/86 |
| 3,969,145 | 7/1976 | Grevstad et al. | 136/86 |
| 3,975,913 | 8/1976 | Erickson | 60/645 |
| 4,024,036 | 5/1977 | Nakamura et al. | 204/129 |
| 4,130,693 | 12/1978 | Van den Berghe et al. | 429/41 |
| 4,142,024 | 2/1979 | Van den Berghe et al. | 429/41 |
| 4,178,418 | 12/1979 | Croset et al. | 429/27 |
| 4,185,131 | 1/1980 | Goller et al. | 427/113 |
| 4,192,906 | 3/1980 | Maru | 429/13 |
| 4,219,443 | 8/1980 | Klinedinst et al. | 252/425 |
| 4,276,355 | 6/1981 | Kothmann et al. | 429/26 |
| 4,287,232 | 9/1981 | Goller et al. | 427/113 |
| 4,463,065 | 7/1984 | Hegedus et al. | 429/33 |
| 4,469,579 | 9/1984 | Covitch et al. | 204/283 |
| 4,476,198 | 10/1984 | Ackerman et al. | 429/32 |
| 4,478,917 | 10/1984 | Fujita et al. | 429/33 |
| 4,500,612 | 2/1985 | Fujii et al. | 429/26 |
| 4,510,211 | 4/1985 | Struthers | 429/18 |
| 4,562,124 | 12/1985 | Ruka | 429/30 |
| 4,598,028 | 7/1986 | Rossing et al. | 429/30 |
| 4,629,537 | 12/1986 | Hsu | 204/15 |
| 4,647,359 | 3/1987 | Lindstrom | 204/294 |
| 4,661,411 | 4/1987 | Martin et al. | 428/421 |
| 4,670,702 | 6/1987 | Yamada et al. | 429/23 X |
| 4,686,158 | 8/1987 | Nishi et al. | 429/26 |
| 4,702,971 | 10/1987 | Isenberg | 429/31 |
| 4,724,191 | 2/1988 | Kuriakose et al. | 429/193 |
| 4,728,584 | 3/1988 | Isenberg | 429/31 |
| 4,749,632 | 6/1988 | Flandermeyer et al. | 429/12 |
| 4,755,376 | 7/1988 | Marianowski | 429/16 |
| 4,767,518 | 8/1988 | Maskalick | 204/242 |
| 4,769,297 | 9/1988 | Reiser et al. | 429/17 |
| 4,770,955 | 9/1988 | Ruhl | 429/33 |
| 4,795,536 | 1/1989 | Young et al. | 204/129 |
| 4,797,185 | 1/1989 | Polak et al. | 204/129 |
| 4,797,190 | 1/1989 | Peck | 204/296 |
| 4,804,592 | 2/1989 | Vanderborgh et al. | 429/33 |
| 4,816,036 | 3/1989 | Kotchick | 29/623 |
| 4,818,637 | 4/1989 | Molter et al. | 429/15 |
| 4,818,735 | 4/1989 | Fujiki et al. | 501/134 |
| 4,824,741 | 4/1989 | Kunz | 429/26 |
| 4,826,741 | 5/1989 | Aldhart et al. | 429/19 |
| 4,826,742 | 5/1989 | Reiser | 429/33 |
| 4,847,172 | 7/1989 | Maskalick et al. | 429/30 |
| 4,849,253 | 7/1989 | Maricle et al. | 427/115 |
| 4,851,303 | 7/1989 | Madou et al. | 429/13 |
| 4,863,813 | 9/1989 | Dyer | 429/33 |
| 4,876,115 | 10/1989 | Raistrick | 427/115 |
| 4,883,497 | 11/1989 | Claar et al. | 29/623 |
| 4,894,355 | 1/1990 | Takeuchi et al. | 502/101 |
| 4,927,793 | 5/1990 | Hori et al. | 501/134 |
| 4,943,494 | 7/1990 | Riley | 429/30 |
| 4,948,680 | 8/1990 | Madou et al. | 429/13 |
| 4,985,315 | 1/1991 | Lemoine | 429/33 |
| 4,994,331 | 2/1991 | Cohen | 429/17 |
| 5,035,961 | 7/1991 | Riley | 429/30 |
| 5,035,962 | 7/1991 | Jensen | 429/40 |
| 5,037,525 | 8/1991 | Badwal | 204/421 |
| 5,045,414 | 9/1991 | Bushnell et al. | 429/23 X |
| 5,047,298 | 9/1991 | Perry, Jr. et al. | 429/17 |
| 5,049,459 | 9/1991 | Akagi | 429/33 |
| 5,059,497 | 10/1991 | Prince et al. | 429/193 |
| 5,069,987 | 12/1991 | Gordon | 429/31 |
| 5,084,144 | 1/1992 | Reddy et al. | 205/104 |
| 5,106,706 | 4/1992 | Singh et al. | 429/31 |
| 5,114,803 | 5/1992 | Ishihara et al. | 429/30 |
| 5,122,425 | 6/1992 | Yoshida et al. | 429/33 |
| 5,130,210 | 7/1992 | Iwasaki et al. | 429/33 |
| 5,132,193 | 7/1992 | Reddy et al. | 429/13 |
| 5,143,801 | 9/1992 | Bates | 429/33 |
| 5,149,601 | 9/1992 | Shiratori et al. | 429/30 |
| 5,154,986 | 10/1992 | Takechi et al. | 429/23 |
| 5,154,987 | 10/1992 | Hash et al. | 429/33 |
| 5,162,167 | 11/1992 | Minh et al. | 429/30 |
| 5,164,060 | 11/1992 | Eisman et al. | 204/282 |
| 5,169,731 | 12/1992 | Yoshimura et al. | 29/30 |
| 5,176,967 | 1/1993 | Ishihara et al. | 429/31 |
| 5,186,806 | 2/1993 | Clark et al. | 204/265 |
| 5,187,025 | 2/1993 | Kelland et al. | 429/33 |
| 5,188,910 | 2/1993 | Ishihara et al. | 429/31 |
| 5,190,834 | 3/1993 | Kendall | 429/31 |
| 5,192,627 | 3/1993 | Perry, Jr. et al. | 429/17 |
| 5,200,278 | 4/1993 | Watkins et al. | 429/24 |
| 5,200,279 | 4/1993 | Draper et al. | 429/30 |
| 5,213,911 | 5/1993 | Bloom et al. | 429/33 |
| 5,217,822 | 6/1993 | Yoshida et al. | 429/33 |
| 5,219,673 | 6/1993 | Kaun | 429/32 |
| 5,223,353 | 6/1993 | Oshawa et al. | 429/192 |
| 5,232,794 | 8/1993 | Krumpelt et al. | 429/30 |
| 5,234,722 | 8/1993 | Ito et al. | 427/453 |
| 5,234,777 | 8/1993 | Wilson | 429/30 |
| 5,242,764 | 9/1993 | Dhar | 429/30 |
| 5,244,753 | 9/1993 | Taniguchi et al. | 429/33 |
| 5,246,792 | 9/1993 | Watanabe | 429/33 |
| 5,248,566 | 9/1993 | Kumar et al. | 429/33 |
| 5,252,410 | 10/1993 | Wilkinson et al. | 429/33 |
| 5,256,499 | 10/1993 | Minia et al. | 429/33 |
| 5,262,249 | 11/1993 | Beal et al. | 429/26 |
| 5,264,299 | 11/1993 | Krasij et al. | 429/30 |
| 5,266,419 | 11/1993 | Yamada | 429/30 |
| 5,266,421 | 11/1993 | Townsend et al. | 429/192 |
| 5,270,131 | 12/1993 | Diethelm et al. | 429/34 |
| 5,272,017 | 12/1993 | Swathirajan et al. | 429/33 |
| 5,273,838 | 12/1993 | Draper et al. | 429/31 |
| 5,279,906 | 1/1994 | Yoshimura et al. | 429/30 |
| 5,281,490 | 1/1994 | Nishioka et al. | 429/33 |
| 5,286,579 | 2/1994 | Akagi | 429/33 |
| 5,290,323 | 3/1994 | Okuyama et al. | 29/623 |
| 5,290,642 | 3/1994 | Minh et al. | 429/33 |
| 5,292,599 | 3/1994 | Soma et al. | 429/30 |
| 5,292,600 | 3/1994 | Kaufman | 429/39 |
| 5,298,235 | 3/1994 | Worrell et al. | 429/33 |
| 5,302,269 | 4/1994 | Eisman et al. | 204/252 |
| 5,304,430 | 4/1994 | Ludwig | 429/17 |
| 5,306,574 | 4/1994 | Singh et al. | 429/13 |
| 5,308,712 | 5/1994 | Seike et al. | 429/30 |
| 5,312,700 | 5/1994 | Ishida | 429/30 |
| 5,316,869 | 5/1994 | Perry, Jr. et al. | 429/19 |
| 5,316,871 | 5/1994 | Swathirajan et al. | 429/33 |
| 5,330,859 | 7/1994 | McPheeters et al. | 429/33 |
| 5,330,860 | 7/1994 | Grot et al. | 429/42 |
| 5,336,570 | 8/1994 | Dodge | 429/31 |
| 5,338,622 | 8/1994 | Hsu et al. | 429/26 |
| 5,342,704 | 8/1994 | Vasilow et al. | 429/31 |
| 5,342,705 | 8/1994 | Minh et al. | 429/32 |
| 5,344,721 | 9/1994 | Sonai et al. | 429/20 |
| 5,346,780 | 9/1994 | Suzuki | 429/42 |
| 5,350,641 | 9/1994 | Mogensen et al. | 429/30 |
| 5,350,643 | 9/1994 | Imahashi et al. | 429/33 |
| 5,354,626 | 10/1994 | Kobayashi et al. | 429/30 |
| 5,356,728 | 10/1994 | Balachandran et al. | 429/8 |
| 5,356,730 | 10/1994 | Minh et al. | 429/32 |
| 5,358,620 | 10/1994 | Golovin et al. | 204/421 |
| 5,358,735 | 10/1994 | Kawaskai et al. | 427/115 |
| 5,358,799 | 10/1994 | Gardner | 429/26 |
| 5,364,711 | 11/1994 | Yamada et al. | 429/15 |
| 5,366,818 | 11/1994 | Wilkinson et al. | 429/13 |

| | | | |
|---|---|---|---|
| 5,368,951 | 11/1994 | Shiratori et al. | 429/30 |
| 5,372,895 | 12/1994 | Sato et al. | 429/30 |
| 5,372,896 | 12/1994 | Binder et al. | 429/33 |
| 5,385,792 | 1/1995 | Shiratori et al. | 429/32 |
| 5,395,704 | 3/1995 | Barnett et al. | 429/30 |
| 5,395,705 | 3/1995 | Door et al. | 429/42 |
| 5,403,461 | 4/1995 | Tuller et al. | 204/252 |
| 5,403,675 | 4/1995 | Ogata et al. | 429/33 |
| 5,407,758 | 4/1995 | Greiner et al. | 429/33 |
| 5,449,697 | 9/1995 | Noaki et al. | 521/27 |
| 5,500,292 | 3/1996 | Muranaka et al. | 429/209 |
| 5,523,175 | 6/1996 | Beal et al. | 429/30 |
| 5,523,177 | 6/1996 | Kosek et al. | 429/40 |
| 5,525,436 | 6/1996 | Savinell et al. | 429/30 |
| 5,532,072 | 7/1996 | Spaeh et al. | 429/34 |
| 5,534,362 | 7/1996 | Okamoto et al. | 429/32 |
| 5,547,777 | 8/1996 | Richards | 429/32 |
| 5,561,202 | 10/1996 | Helmer-Metzmann et al. | 525/471 |
| 5,624,769 | 4/1997 | Li et al. | 429/32 |
| 5,639,516 | 6/1997 | Dirven et al. | 427/421 |
| 5,654,109 | 8/1997 | Plowman et al. | 429/13 |
| 5,763,113 | 6/1998 | Meltser et al. | 429/13 |

OTHER PUBLICATIONS

Tager et al; Polymer Science vol. 33, 1991 pp. 282–287, (month unknown).

Wilson et al., Private Paper 1996, 8 pages, (month unknown).

Lam–Leung et al; Journal of Applied Polymer Science, vol. 57, 1995, pp. 1373–1379, (month unknown).

Dowling et al; Macromolecules 1991, pp. 4131–4237, (month unknown).

Thedoropoulouse et al; Journal of Applied Polymer Science, vol. 46, 1992, pp. 1461–1465, (month unknown).

Chainey et al; Journal of Polymer Science, 1989, vol. 27, pp. 3187–3199, (month unknown).

Tovbin et al; Russian Journal of Physical Chemistry, vol. 67, 1993, pp. 471–474, (month unknown).

Krever et al; Chemical Material 1996, vol. 8, pp. 610–641, (month unknown).

Wieczorek et al; Electrochimica Acta, vol. 40, (1995), pp. 2327–2330, (month unknown).

Poinsignon et al; Materials Science and Engineering (1989), pp. 31–37, (month unknown).

Solomin; Polymer Science USSR vol. 34, 1992, pp. 274–275, (month unknown).

Zawodzinski et al; Solid State Ionics, vol. 60 (1993), pp. 199–211, (month unknown).

Ticianelli et al; Journal of Applied Electro–Chemistry, vol. 21 (1991), pp. 597–605, (month unknown).

Savodogo et al; Journal of the Electro Chemical Society, vol. 141, No. 8, 1994, pp. L92–L95, (month unknown).

Staiti et al; Journal of Applied Electrochemistry; vol. 22 (1992), pp. 663–667. (month unknown).

Gao et al; Electrochimica Acta; vol. 37, No. 8, pp. 1327–1332 (1992), (month unknown).

Mosdale et al; Solid State Ionics; vol. 61 (1993), pp. 251–255, (month unknown).

Uchida et al; Journal of the Electrochemical Society; No. 142 (1995), pp. 463–468, (month unknown).

Shukla et al; Journal of Applied Electrochemistry; vol. 19 (1989), pp. 383–386, (month unknown).

Hamnett et al; Journal of Applied Electrochemistry, vol. 21, (1991), pp. 982–985, (month unknown).

Ticianelli et al; Journal of Electro Chemical Society; vol. 135, (1988), pp. 2209–2214, (month unknown).

Prater et al; Journal of Power Sources; vol. 37 (1992), pp. 181–188, (month unknown).

Prater et al; Journal of Power Sources; vol. 29, (1990), pp. 239–250, (month unknown).

Svinivasan et al; Journal of Power Sources; vol. 22 (1988), pp. 359–375, (month unknown).

Ticianelli et al; Journal of Electroanalytical Chemistry; vol. 251 (1988), pp. 275–295, (month unknown).

Moore et al; Macromolecules; vol. 22 (1984), 3594–3599, (month unknown).

U.S. Dept. of Energy; Fuels Cells A Handbook (Revision 3); Jan. 1994, pp. 1–1—9–14.

Fuel Cell Systems; American Chemical Society Symposia, Apr. 6–7, 1964, pp. 18–201.

Fuel Cell Systems II; American Chemical Society Symposia, Sep. 12–14, 1967, pp. 1–80.

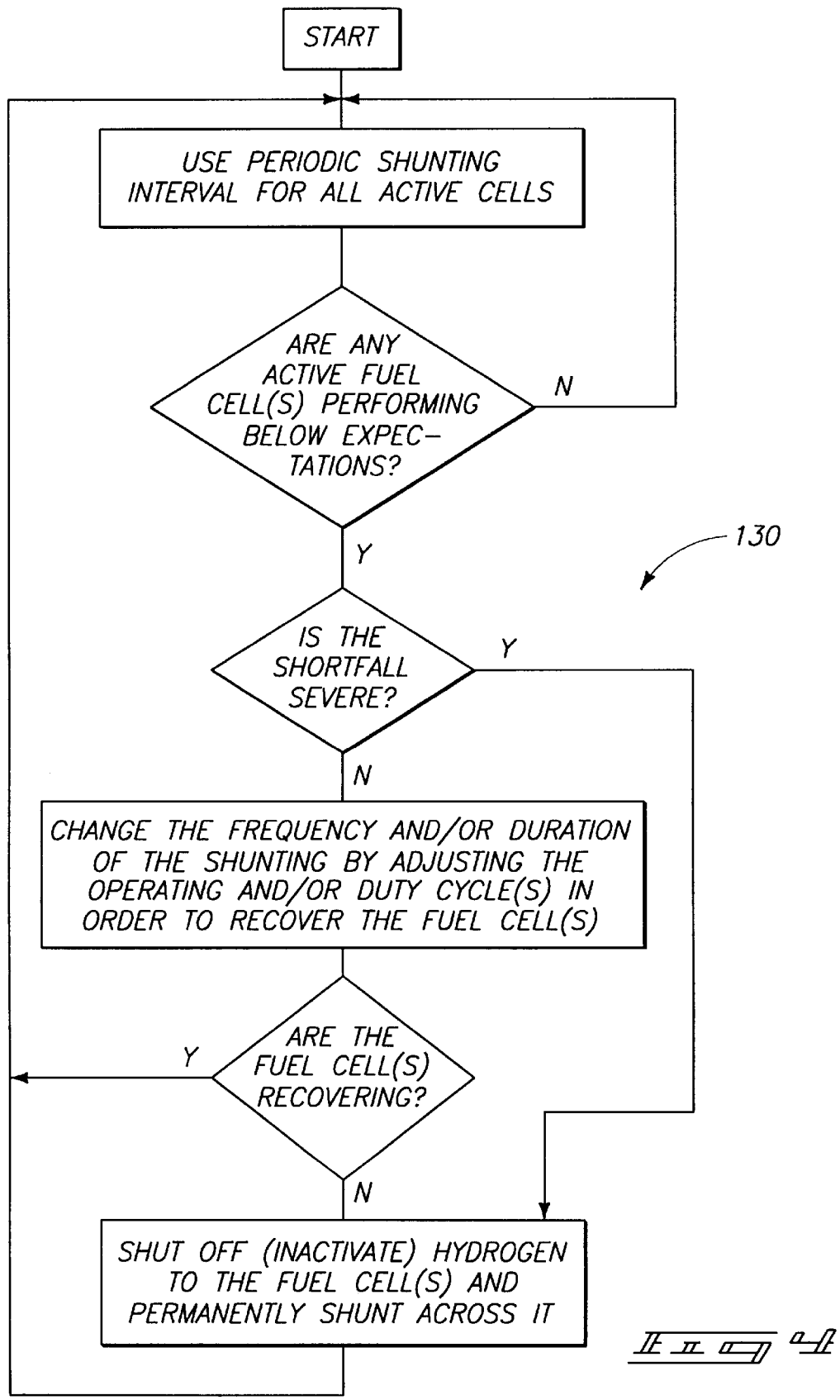

FUEL CELL AND METHOD FOR CONTROLLING SAME

RELATED PATENT DATA

The present application is a continuation-in-part of U.S. patent application Ser. No. 08/979,853 and which was filed on Nov. 20, 1997.

BACKGROUND OF THE INVENTION

1. Field of the Invention

The present invention relates to an improved fuel cell and method for controlling same, and more specifically to a fuel cell which includes an electrical circuit which, on the one hand, prevents damage to the internal components thereof upon failure of the fuel cell; and which also can be utilized to increase the electrical power output of same.

2. Description of the Prior Art

The fuel cell is an electrochemical device which reacts hydrogen, and oxygen, which is usually supplied from the ambient air, to produce electricity and water. The basic process is highly efficient and fuel cells fueled directly by hydrogen are substantially pollution free. Further, since fuel cells can be assembled into stacks of various sizes, power systems have been developed to produce a wide range of electrical power output levels and thus can be employed in numerous industrial applications.

Although the fundamental electrochemical processes involved in all fuel cells are well understood, engineering solutions have proved elusive for making certain fuel cell types reliable, and for others economical. In the case of polymer electrolyte membrane (PEM) fuel cell power systems reliability has not been the driving concern to date, but rather the installed cost per watt of generation capacity has. More recently, and in order to further lower the PEM fuel cell cost per watt, much attention has been directed to increasing the power output of same. Historically, this has resulted in additional sophisticated balance-of-plant systems which are necessary to optimize and maintain high PEM fuel cell power output. A consequence of highly complex balance-of-plant systems is that they do not readily scale down to low capacity applications. Consequently, cost, efficiency, reliability and maintenance expenses are all adversely effected in low generation applications.

It is well known that single PEM fuel cells produce a useful voltage of only about 0.45 to about 0.7 volts D.C. under a load. Practical PEM fuel cell plants have been built from multiple cells stacked together such that they are electrically connected in series. It is further well known that PEM fuel cells can operate at higher power output levels when supplemental humidification is made available to the proton exchange membrane (electrolyte). In this regard, humidification lowers the resistance of proton exchange membranes to proton flow. To achieve this increased humidification, supplemental water can be introduced into the hydrogen or oxygen streams by various methods, or more directly to the proton exchange membrane by means of the physical phenomenon known as of wicking, for example. The focus of investigations, however, in recent years has been to develop membrane electrode, assemblies (MEA) with increasingly improved power output when running without supplemental humidification. Being able to run an MEA when it is self-humidified is advantageous because it decreases the complexity of the balance-of-plant with its associated costs. However, self-humidification heretofore has resulted in fuel cells running at lower current densities and thus, in turn, has resulted in more of these assemblies being required in order to generate a given amount of power.

While PEM fuel cells of various designs have operated with varying degrees of success, they have also had shortcomings which have detracted from their usefulness. For example, PEM fuel cell power systems typically have a number of individual fuel cells which are serially electrically connected (stacked) together so that the power system can have a increased output voltage. In this arrangement, if one of the fuel cells in the stack fails, it no longer contributes voltage and power. One of the more common failures of such PEM fuel cell power systems is where a membrane electrode assembly (MEA) becomes less hydrated than other MEAs in the same fuel cell stack. This loss of membrane hydration increases the electrical resistance of the effected fuel cell, and thus results in more waste heat being generated. In turn, this additional heat dries out the membrane electrode assembly. This situation creates a negative hydration spiral. The continual overheating of the fuel cell can eventually cause the polarity of the effected fuel cell to reverse such that it now begins to dissipate electrical power from the rest of the fuel cells in the stack. If this condition is not rectified, excessive heat generated by the failing fuel cell will cause the membrane electrode assembly to perforate and thereby leak hydrogen. When this perforation occurs the fuel cell stack must be completely disassembled and repaired. Depending upon the design of fuel cell stack being employed, this repair or replacement may be a costly, and time consuming endeavor.

Further, designers have long sought after a means by which current densities in self-humidified PEM fuel cells can be enhanced while simultaneously not increasing the balance-of-plant requirements for these same devices.

Accordingly, an improved fuel cell is described which addresses the perceived problems associated with the prior art designs and practices while avoiding the shortcomings individually associated therewith.

SUMMARY OF THE INVENTION

A first aspect of the present invention is to provide a fuel cell which has a controller electrically coupled with the fuel cell and which shunts the electrical current between the anode and cathode of the fuel cell during predetermined operational conditions.

Another aspect of the present invention relates to a fuel cell having a controller which is electrically coupled with the fuel cell and which shunts the electrical current between the anode and cathode of the fuel cell, and wherein in a first condition, the controller upon sensing a given voltage and current output terminates the supply of the fuel gas to the defective fuel cell while simultaneously shunting the electrical current between the anode and the cathode of the defective fuel cell thereby effecting an electrical by-pass of same.

Another aspect of the present invention relates to a fuel cell having a controller which is electrically coupled with the fuel cell, and which shunts the electrical current between the anode and the cathode of the fuel cell during predetermined operational conditions, and wherein in a second condition, the fuel cell has a duty and operating cycle, and the controller periodically shunts electrical current between the anode and cathode during the duty cycle of the fuel cell thereby causing a resulting increase in the power output of same.

Yet another aspect of the present invention relates to a fuel cell having an anode, and a cathode and which produces electrical power having a given voltage and current output and which includes:

a membrane having opposite sides, and wherein the anode is mounted on one side of the membrane and the cathode is mounted on the side of the membrane opposite to the anode;

a supply of fuel gas disposed in fluid flowing relation relative to the anode, and a supply of an oxidant gas disposed in fluid flowing relation relative to the cathode;

voltage and current sensors which are individually electrically coupled with the anode and cathode;

a valve disposed in fluid metering relation relative to the supply of fuel gas to control the supply of fuel gas to the fuel cell;

an electrical switch electrically coupled with the anode and cathode and which can be placed into an open and closed electrical condition; and a controller coupled with the electrical switch, valve and the voltage and current sensors, the controller upon sensing a given voltage and current at the voltage and current sensors causing the valve to be adjusted into a predetermined fluid metering relationship relative to the supply of fuel gas, and the electrical switch to assume a predetermined open or closed electrical condition, and wherein the controller in a first condition, shunts current between the anode and cathode of the fuel cell when the electrical switch is in the closed electrical condition, and simultaneously causes the valve to terminate the supply of fuel gas to the anode of the fuel cell, and wherein the electrical switch when placed in the open electrical condition by the controller causes the valve to be placed in a condition which allows the substantially continuous supply of fuel gas to the anode of the fuel cell; and wherein the controller, in a second condition, shunts current between the anode and cathode of the fuel cell when the electrical switch is placed in the closed electrical condition while simultaneously maintaining the valve in a condition which allows the substantially continuous delivery of fuel gas to the anode of the fuel cell during the opening and closing of the electrical switch.

Yet, still a further aspect of the present invention relates to a fuel cell having a controller which is operable to shunt electrical current between the anode and cathode of the fuel cell during the duty cycle thereof, and wherein in the second operational condition the operating cycle is about 0.01 seconds to about 4 minutes; and wherein the electrical power output of the fuel cell increases by at least about 5%, and wherein the duration of the shunting during the duty cycle is less than about 20% of the operating cycle.

These and other aspects of the present invention will be discussed in further detail hereinafter.

DETAILED DESCRIPTION OF THE DRAWINGS

The accompanying drawings serve to explain the principals of the present invention.

FIG. 4 is a flow chart of a computer program which coordinates the operation of the electrical circuit shown in FIG. 3.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 2:
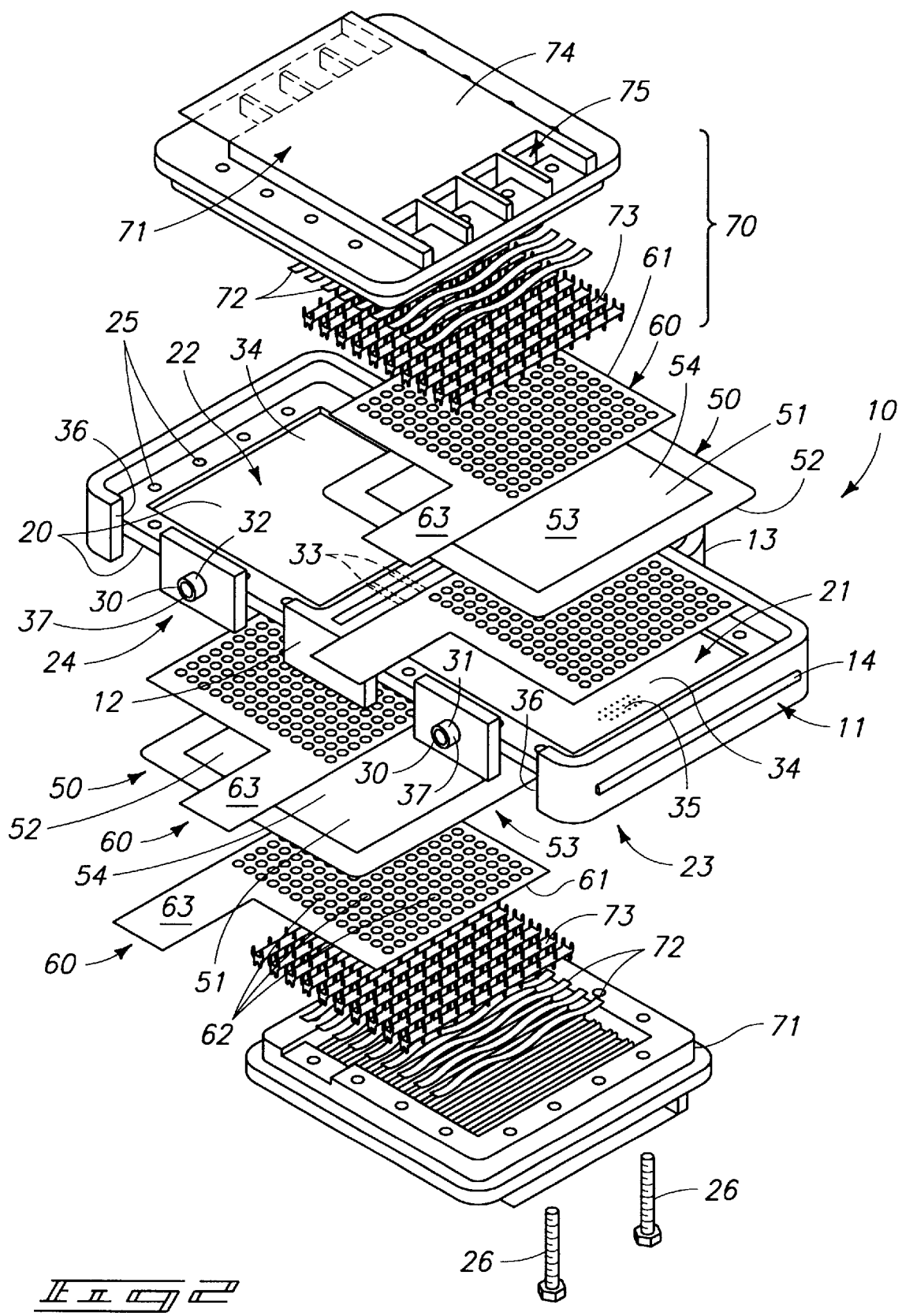
FIG. 2 is a partial, exploded, perspective view of a PEM fuel cell module which is utilized in connection with the present invention.

The improved polymer electrolyte membrane (PEM) fuel cell of the present invention is best understood by reference to FIG. 2 and is generally designated by the numeral 10. The PEM fuel cell, as a general matter, includes a hydrogen distribution frame 11. The hydrogen distribution frame is fabricated from a substrate which has a flexural modulus of less than about 500,000 lbs per square inch, and a compressive strength of less than about 20,000 lbs per square inch. As such, any number of suitable and equivalent thermoplastic materials can be utilized in the fabrication of same. The hydrogen distribution frame 11 includes a main body 12 as seen in FIG. 2. The main body has opposite ends, and a handle 13, which allows for the convenient manual manipulation of same. The handle is made integral with the main body 12. Still further, elongated guide members or spines 14 are located on the opposite ends of the main body 12. Each spine 14 is operable to be matingly received in, or cooperate with, elongated channels which are formed in the top and bottom portions of a subrack which will be described in further detail hereinafter.

Figure 3:
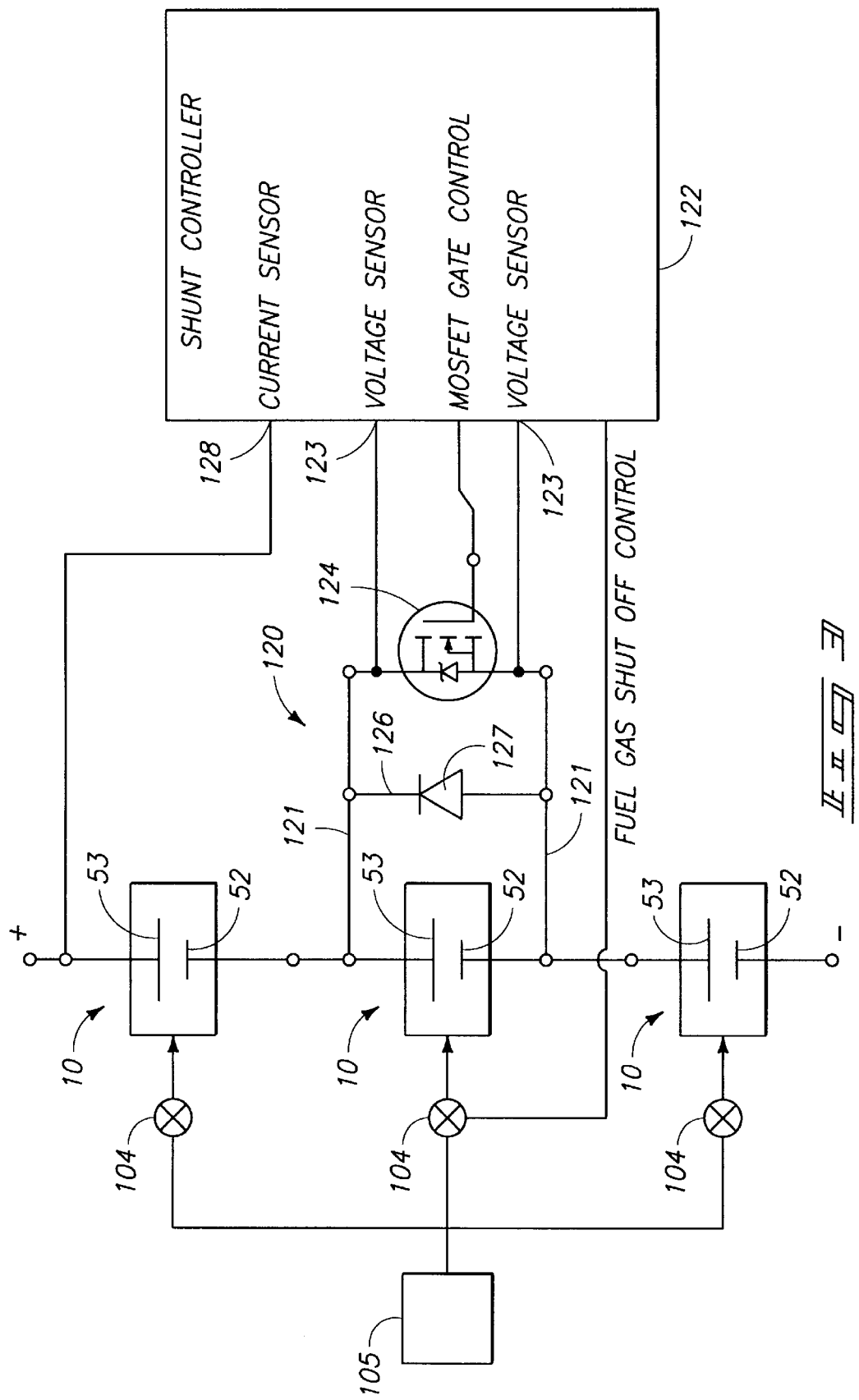
FIG. 3 is a greatly simplified schematic representation of the electrical circuit which is utilized in the present invention.

As seen in FIG. 2, the main body 12 defines a plurality of substantially opposed cavities which are generally indicated by the numeral 20, but which individually are indicated by the numerals 21, 22, 23, and 24, respectively. Still further, a plurality of apertures 25 are formed in given locations in the main body 12 and are operable to receive fasteners 26. The main body further defines a pair of passageways 30. The pair of passageways include a first passageway 31 which permits the delivery of hydrogen gas from a source of same (as seen in FIG. 3) and a second passageway 32 which facilities the removal of impurities, water and unreacted hydrogen gas from each of the cavities 21 through 24. A linking passageway 33 operably couples each of the first and second cavities 21 and 22 and the third and fourth cavities 23 and 24 in fluid flowing relation one to the other, such that hydrogen gas delivered by means of the first passageway 31 may find its way into each of the cavities 21 through 24 respectively. Each of the cavities 21 through 24 are substantially identical in their overall dimensions and shape. Still further, each cavity has a recessed area 34 having a given surface area, and depth. Positioned in each of the recessed areas 34 and extending substantially normally outwardly therefrom are a plurality of small projections 35. The function of these individual projections will be discussed in greater detail below. As seen in FIG. 2, the first and second passageways 31 and 32 are connected in fluid flowing relation relative to each of the recessed areas 34. The main body 12 also includes a peripheral edge which is discontinuous. In particular, the peripheral edge defines a number of gaps or openings 36 therethrough. Still further, each passageway 31 and 32 has a terminal end 37 which has a given outside diametral dimension. The terminal end 37 of each passageway 31 and 32 is operable to matingly couple in fluid flowing relation relative to valves which will be discussed in greater detail hereinafter.

Mounted within each the respective cavities 21 through 24, respectively, is a membrane electrode assembly 50. The membrane electrode assembly (MEA) has a main body 51 formed of a solid electrolyte. This membrane electrode assembly is described in significant detail in co-pending U.S. application Ser. No. 08/979,853, and which was filed on Nov. 20, 1997, the teachings of which are incorporated by reference herein. The main body 51 of the MEA has an anode side 52, and an opposite cathode side 53. The anode side 52 is held in spaced relation relative to the hydrogen distribution frame 11 which forms the respective cavities 21 through 24 by the plurality of projections 35. This relationship insures that the hydrogen delivered to the respective cavities, and more specifically to the anode side thereof, reaches all parts of the anode side 52 of the MEA. Electrodes 54, comprising catalytic anode and cathode electrodes are formed on the main body 52. These electrodes are further described in the aforementioned U.S. patent application, the teachings of which are also incorporated by reference herein. Additionally, noncatalytic, electrically conductive diffusion layers, not shown, are affixed on the anode and cathode electrodes and have a given porosity. These noncatalytic electrically conductive diffusion layers are also described in the aforementioned patent application, but for purposes of brevity, are not discussed in further detail herein.

As further seen in FIG. 2, the PEM fuel cell 10 of the present invention further includes a pair of current collectors 60 which are received in each of the respective cavities 21 through 24 respectively. The respective current collectors are individually disposed in juxtaposed ohmic electrical contact with the opposite anode and cathode side 52 and 53 of each of the MEAs 50. Each current collector has a main body 61 which has a plurality of apertures 62 formed therein. A conductive member or portion 63 extends outwardly from the main body and is designed to extend through one of the gaps or openings 36 which are in the hydrogen distribution frame 11. This is understood by a study of FIG. 1. Each conductive member 63 is received between and thereafter electrically coupled with pairs of conductive contacts which are mounted on the rear wall of a subrack which will be described in greater detail, below. The fabrication of the current collectors is described in detail in the aforementioned U.S. patent application, the teachings of which are incorporated by reference herein.

Figure 1:
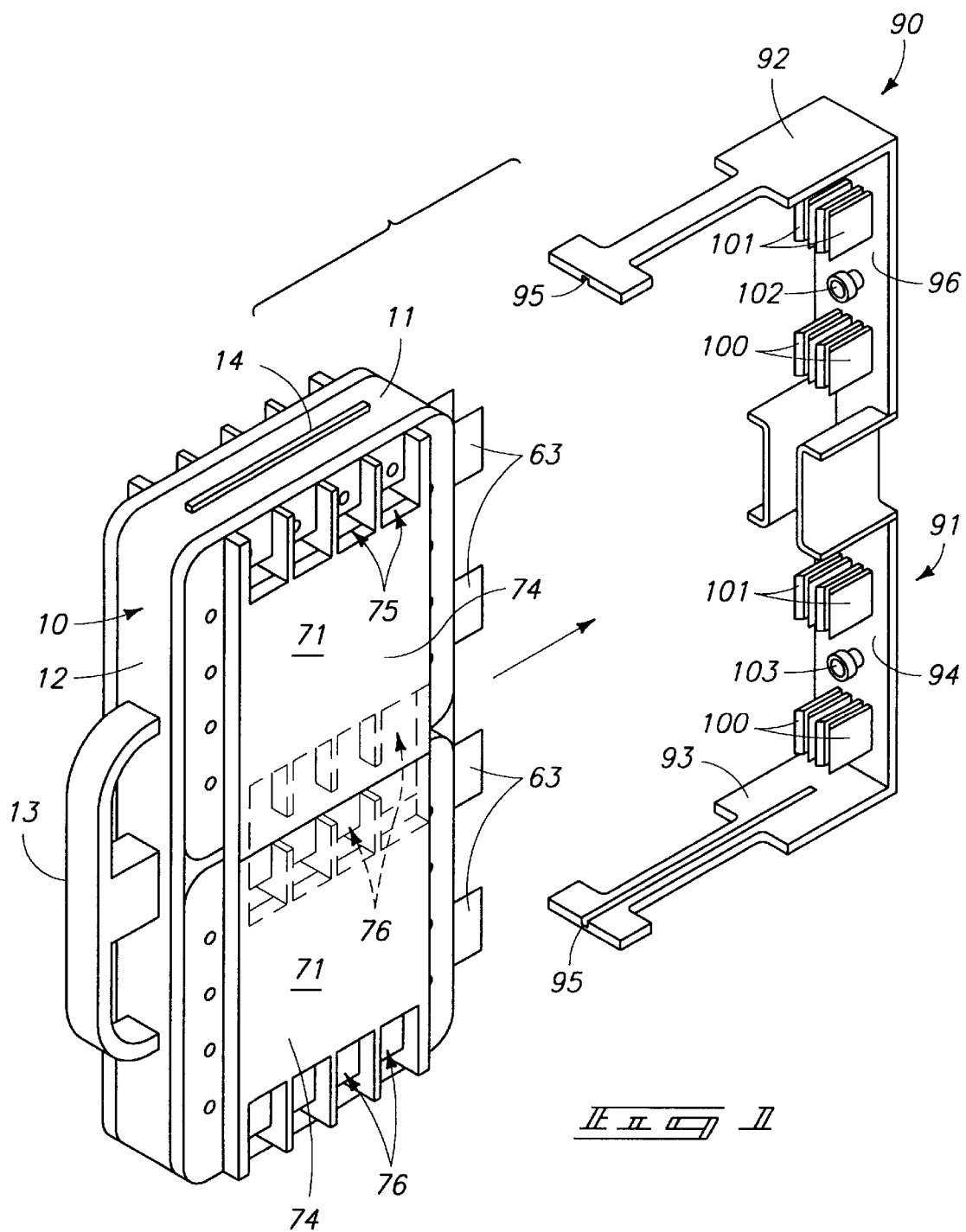
FIG. 1 is a partial perspective, exploded, side elevation view of a PEM fuel cell module utilized with the present invention and the accompanying portion of the subrack which mates with same.

As further illustrated in FIG. 2, the PEM fuel cell 10 of the present invention further includes individual force application assemblies 70 for applying a given force to each of the current collectors 60, and the MEA 50 which is sandwiched therebetween. In this regard, the individual force application assemblies comprise a cathode cover 71 which partially occludes the respective cavities of the hydrogen distribution frame 11. As seen in FIGS. 1 and 2, the respective cathode covers 71 individually releasably cooperate or otherwise mate with each other, and with the hydrogen distribution frame 11. A biasing assembly 72, which is shown herein as a plurality of metal wave springs, cooperates with the cathode cover and is operable to impart force to an adjacent pressure transfer assembly 73. Each of the cathode covers nest or otherwise matingly couples or engages with one of the respective cavities 21 through 24, respectively, which are defined by the hydrogen distribution frame 11. When appropriately nested, individual apertures 75 which are defined by the outside surface 74 of the cathode cover, define passageways 76 which permits air to circulate to the cathode side of the membrane electrode assembly 50. The fasteners 26 are received through each of the cathode covers and through the hydrogen distribution frame that is sandwiched therebetween in order to exert a predetermined force sufficient to maintain the respective current collectors 60 in ohmic electrical contact with the associated MEA 50. The circulation of air through the fuel cell 10 and its functional cooperation with the associated subrack are discussed in significant detail in the aforementioned earlier filed patent application, the teachings of which are also incorporated by reference herein.

As seen in FIG. 1, and as disclosed in a much more complete fashion in the earlier filed U.S. patent application which is referenced, above, the PEM fuel cell 10 is operable to be serially electrically coupled with a plurality of other fuel cells by way of a subrack which is generally indicated by the numeral 90. The subrack 90 has a main body 91 having top and bottom portions 92 and 93 respectively. The top and bottom portions are joined together by a rear wall 94. Elongated channels 95 are individually formed in top and bottom portions and are operable to slidably receive the individual spines 14 which are formed on the hydrogen distribution frame 11. As best understood in the exploded view of FIG. 1, the subrack 90 is made of a number of mirror image portions 96, which when joined together, form the main body 91 of the subrack 90. These mirror image portions 96 are fabricated from a moldable dielectric substrate. The functional attributes of the subrack 90 are disclosed in significant detail in the earlier filed application, the teachings of which are incorporated by reference herein. As best seen in FIG. 1, a DC (direct current) bus 100 is affixed on the rear wall 94 of the subrack 90. A repeating pattern of eight pairs of conductive contacts 101 are attached on the rear wall. Further, first and second valves 102 and 103 are also attached to the rear wall and are operable to matingly couple in fluid flowing relation to the hydrogen distribution frame. The respective first and second valves extend through the rear wall and connect with suitable conduits (not shown). The first valve 102 is coupled in fluid flowing relation with a source of hydrogen 105 (FIG. 3). Further, the second valve 102 exhausts to ambient or may be coupled in fluid flowing relation with other systems such as a hydrogen recovery and recycling system as disclosed in the earlier filed application. Finally, the fuel cell 10 includes a third valve 104, as shown in FIG. 3, which is disposed in fluid metering relation between the supply of hydrogen 105 and the first valve 102. The subrack 90 also includes an air distribution system (not shown) and which moves ambient air in a predetermined pattern through the fuel cell 10. This air distribution system is discussed in significant detail in the earlier filed application, but for purposes of brevity, is not discussed in further detail herein.

Referring now to FIG. 3, a plurality of fuel cells 10 are shown where they are serially electrically coupled together to produce electrical current having a given voltage and current output. A shunt control circuit 120 is shown. The shunt control circuit 120 includes an electrical path 121 which electrically couples the anode and cathode 52 and 53 of one of the fuel cells together. It should be understood that this electrical circuit is present for or otherwise associated with each of the fuel cells shown in FIG. 3, that is, discrete shunt control circuits 120 individually electrically couples the anode and cathode of each of the serially coupled fuel cells together. In FIG. 3, however, for simplicity sake, only one of these circuits is shown. Each of the shunt control circuits are electrically coupled to a single shunt controller which is generally designated by the numeral 122. As noted, above, the shunt controller is illustrated as being coupled to only one shunt control circuit. However, the shunt controller would in reality be coupled to numerous shunt control circuits corresponding to each of the serially coupled fuel cells. FIG. 3, as noted above, is greatly simplified to illustrate the present invention.

The shunt controller 122 comprises a number of individual components including a pair of voltage sensors 123 which are electrically coupled with the anode and cathode 52 and 53 to sense the voltage at the anode and cathode 52 and 53 of each of the respective fuel cell 10. Still further, the shunt controller is electrically coupled to an electrical switch 124, here shown as being a field effect transistor of conventional design. A suitable commercially acceptable MOSFET may be secured from Mitsubishi under the trade designated FS100UMJ. The shunt controller 122 may be purchased through conventional retail sources. A suitable controller 122 for this application is the programmable microcontroller chip having the trade designation MC68HC705P6A, and which may be utilized and programmed to execute the program logic, as shown in FIG. 4, and which will allow the shunt control circuit to react to the first and second operational conditions of the fuel cell 10, as will be described in greater detail, below. The shunt controller 122 is further electrically coupled in controlling relation relative to the valves 104 which are disposed in fluid metering relation relative to the supply of fuel gas 105 (identified as the fuel gas shut-off control). The shunt control circuit 120 has a bypass electrical circuit 126 which further electrically couples the anode and cathode 52 and 53 of each of the fuel cells 10 together. The bypass electrical circuit comprises a diode 127. A current sensor 128 is further electrically coupled to the fuel cells 10 to detect the current of same. The current sensor is made integral with the shunt controller 122. As noted above, the shunt control circuit 120 is controlled by programmable logic which is set forth more specifically in FIG. 4 and is generally indicated by the numeral 130. The bypass electrical circuit is operable to shunt electrical current between the anode and cathode of the fuel cells 10 upon failure of the shunt controller 122.

As best understood by a study of FIG. 3, the fuel cell 10 has an anode and a cathode 52 and 53 which produces electrical power having a given current and voltage output. The controller 122 is electrically coupled with the fuel cell 10 and is operable to shunt the electrical current between the anode and the cathode of the fuel cell under predetermined operational conditions. As earlier discussed, the shunt controller 122 includes voltage and current sensors 123 and 128 which are disposed in voltage and current sensing relation relative to the voltage and current output of the fuel cell 10 and are further electrically coupled with the anode and cathode 52 and 53 of the fuel cell 10. Still further, the shunt controller 122 further comprises an electrical switch, and which is shown herein as a field effect transistor 124. The field effect transistor 124 has open and closed electrical conditions. As will be described in further detail below, the controller 122 upon sensing, by way of the voltage and current sensors 123 and 128, a given voltage and current output of the fuel cell 10, adjusts the valve 104 into a predetermined fluid metering relationship relative to the supply of fuel gas 105. Still further, the controller 122 positions the field effect transistor in an open or closed electrical condition, based upon predetermined performance parameters for the respective fuel cells 10.

In this regard, and in a first operational condition where a given fuel cell is performing at or below predetermined performance, parameters or expectations, as might be the case where the voltage output of the fuel cell is less than about 0.4 volts, the controller 122 is operable to simultaneously cause the valve 104 to assume a position where it terminates the supply of fuel gas 105 to the fuel cell 10 and places the electrical switch 124 in a closed electrical condition thereby shunting current from the anode 52 to the cathode 53 to substantially prevent heat related damage from occurring to the fuel cell 10 as might be occasioned when the negative hydration spiral occurs. This was discussed earlier in the application. Still further, if the electrical switch 124 is subsequently placed in the open position, the controller 122 is operable to cause the valve 104 to be placed in a condition which allows the substantially continuous supply of fuel gas to the fuel cell.

In the first and second operational conditions which are described herein, the predetermined performance parameters of the individual and serially electrically coupled fuel cells 10 comprise selected current and voltage outputs of the fuel cell 10. These predetermined threshold performance parameters may be determined by various means including but not limited to, experiment; operational history or electrical load, for example. Additionally, the predetermined performance parameters might include, in the first condition, for example, where the performance parameters of the fuel cell are just merely or generally declining over a given time interval; are declining or in a range of less than about 0.4 volts; or are declining or degrading, generally speaking in relative relation to the performance parameters of other fuel cells 10 with which it is serially electrically coupled. This list of possible parameters is not all inclusive and many other physical and operational parameters could be monitored, and which would tend to suggest that a selected fuel cell is beginning to fail, and should be disconnected from the stack for repair or replacement if the shortcoming in performance is severe, or on the other hand subjected to increased shunting to determine if the fuel cell 10 can be recovered back to the predetermined performance parameters selected. This is best illustrated by reference to FIG. 4.

In the second operational condition, the shunting circuit 120 is operable to increase the resulting electrical power output of the fuel cell 20. As discussed above, the fuel cells 10 have predetermined performance parameters comprising selected current and voltage outputs of the fuel cell 10. In the second condition, and where the performance parameters may be merely declining and have not decreased below a minimum threshold, and as was discussed above, the shunting circuit 120 is employed in an effort to restore individual and groups of fuel cells 10 to the given performance parameters. For example, selective, or groups of fuel cells 10 may begin to decline in their voltage and current output over time. As this decline is detected by the shunt controller 122, the controller 122 is operable, by way of the shunt control circuit 121 to serially, repeatedly shunt the current between the anode and cathode of the degraded performance fuel cells 10 at individually discrete rates which are effective to restore the fuel cells to the predetermined performance parameters. In another example, where the performance parameters may be merely declining, the controller 122 is effective to adjust the duty cycle of individual fuel cells 10 by reference to the declining performance parameters of the fuel cell in relative comparison to the performance parameters of other fuel cells to improve the electrical performance of same. As should be understood, the word "duty cycle" as utilized hereinafter means the ratio of the "on time" interval occupied in operating a device to the total time of one operating cycle (the ratio of the pulse duration time to the pulse-repetition time). Another way of defining the term duty cycle is the ratio of the working time to the total operating time for intermittent operating devices. This duty cycle is expressed as a percentage of the total operating cycle time. In the present invention, therefore, the shunt controller 122 is operable to adjust both the duration of the shunting, as well as the operating cycle time as to selective fuel cells in order to restore or maintain the fuel cells above the predetermined performance parameters selected.

As noted above, the inventors have discovered that in the second operational condition, enhanced fuel cell performance can be achieved by adjustably, repeatedly and serially shunting current between the anode and cathode 52, and 53 of the fuel cell 10. In this regard, and in the second operational condition, the programmable logic as shown at 130 in FIG. 4 is utilized by the shunt controller 122 to individually, adjustably and periodically open and close each of the electrical switches 124 that are individually electrically coupled and associated with each of the fuel cells 10. These electrical switches 124 may be activated individually, serially, in given groups, or patterns, or in any fashion to achieve the predetermined voltage and current output desired. In this regard, it has been determined that the preferred operating cycle time is about 0.01 seconds to about four minutes. When this periodic shunting is implemented, it has been discovered that the voltage output of the fuel cells 10 increases by at least about 5%. Still further, the shunt control circuit 120 is operable to shunt the electrical current for a duration of less than about 20% of the operating cycle.

During the second operational condition, the shunt controller 122 causes the valve 104 to remain in a condition which allows the substantially continuous supply of fuel gas 105 to the fuel cell 10. It is speculated that this repeated, and periodic shunting causes each of the fuel cells 10 to be "conditioned", that is, such shunting is believed to cause an increase in the amount of water that is made available to the MEA 50 thereby increasing the MEAs performance. It is also conceivable that the shunting provides a short term increase in heat dissipation that is sufficient to evaporate excess water from the diffuser layers which are mounted on the MEA. This evaporation of water thus makes more oxygen from the ambient air available to the cathode side of the MEA. Whatever the cause the shunting appears to increase the proton conductivity of the MEA. This increase in proton conductivity results in a momentary increase in the power output of the fuel cell which diminishes slowly over time. The overall increase in the electrical power output of the fuel cell 10, as controlled by the adjustably sequential and periodic shunting of individual, and groups of fuel cells 10, results in the entire serially connected group of fuel cells to increase in its overall power production. As noted above, the respective shunting control circuits 120 are individually operably connected with each of the serially coupled fuel cells 10, and can be rendered operable for single fuel cells, and groups of fuel cells. Additionally, the duty and operating cycles of the respective fuel cells may be adjusted in any number of different combinations and for individually discrete durations, depending upon the performance of the individual fuel cells, to boost the performance of same; or for purposes of stabilizing the decreasing performance of a given group of fuel cells or individual fuel cells as the case may be.

OPERATION

The operation of the described embodiment of the present invention is believed to be readily apparent and is briefly summarized at this point.

In its broadest sense, the present invention relates to a fuel cell 10 having an anode and a cathode 52 and 53 and which produces electrical power having a given current and voltage output. The fuel cell 10 includes a controller 122 which is electrically coupled with the fuel cell 10 and which shunts the electrical current between the anode and cathode of the fuel cell. As noted earlier, the controller 122 comprises voltage and current sensors 123 and 128 which are disposed in voltage and current sensing relation relative to the electrical power output of the fuel cell 10. The controller 122 further comprises an electrical switch 124 having open and closed electrical conditions. The controller, in a first operational condition, upon sensing by way of the voltage and current sensors a given electrical power output of the fuel cell 10, places the valve 104 into a predetermined fluid impeding relationship relative to the supply of fuel gas 105. In this first condition, the electrical switch may be positioned in an open or closed electrical condition, depending upon the predetermined performance parameters of the fuel cell 10. As noted above, in the first operational condition, assuming the performance parameters are not met, the controller 122, in response, closes the electrical switch. This closed switch shunts current between the anode and the cathode of the fuel cell. Substantially, simultaneously, the controller 122 causes the valve 104 to terminate the supply of fuel gas to the fuel cell 10 when this condition exists. As noted earlier, when the voltage output of the fuel cell 10 is less than about 0.4 volts, the electrical switch assumes a closed position thereby shunting voltage between the anode and cathode, while simultaneously causing the valve to terminate the supply of fuel gas 105. As earlier discussed in this application, a negative hydration spiral can result in excessive heat which causes damage to the MEA 50. In this first operational condition, the shunt control circuit 120 is operable to shunt the current thereby preventing this damage. Of course, the performance parameters which may trigger the first operational condition can include declining performance parameters; or declining performance parameters in relative comparison to the performance parameters being achieved by other fuel cells 10. Still other parameters not listed herein could also be used.

The shunt control circuit 120, as earlier disclosed, has a passive bypass electrical circuit 126 comprising a diode 127. In the event that the shunt control circuit 121 fails in conjunction with a failing fuel cell, the bypass electrical circuit causes the shunt control circuit to be rendered operational to prevent this aforementioned damage from occurring. The diode 127 selected is normally reverse biased when the fuel cell 10 is producing power, and it has no effect on the shunt control circuit 121 under normal operational conditions. As the fuel cell 10 fails, however, and the voltage output nears 0 or becomes negative, the diode 127 becomes forward biased. The voltage can then travel through the diode 27 instead of the fuel cell 10. The maximum negative voltage depends upon the type of diode selected. A Schottky barrier diode which is commercially available as 85CNQ015, is preferred. These diodes allow high current to flow at approximately 0.3 volts. This voltage limitation limits the maximum positive negative voltage of the fuel cell thereby preventing overheating and subsequent damage.

In the second operational condition, the shunt controller 122, by implementing the logic shown in FIG. 4 at numeral 130 shunts current between the anode and cathode 52 and 53 of the fuel cell 10 when the electrical switch 124 is in the closed condition, while simultaneously maintaining the valve 104 in a condition which allows the substantially continuous delivery of fuel gas to the fuel cell as the shunt controller periodically opens and closes the electrical switch. As noted earlier, the fuel cell 10 has a duty cycle; and an operating cycle of about 0.01 seconds to about 4 minutes. The inventors have discovered that the periodic shunting by opening and closing the electrical switch 124 during the duty cycle increases the overall electrical power output of the fuel cell 10. This results in the serially coupled fuel cells increasing in voltage and current output by at least about 5%. The duration of the shunting during the duty cycle is less than about 20% of the operating cycle.

The present fuel cell 10, and associated circuitry 121, provides a convenient method for controlling the fuel cell 10 which has an anode and a cathode 52 and 53 and a given voltage and current output which includes, providing a supply of a fuel gas 105 in fluid flowing relation relative to the anode 52 of the fuel cell;

providing a valve 104 disposed in adjustable fluid metering relation relative to the supply of fuel gas 105;

providing a controller 122 which is electrically coupled in current and voltage sensing relation with the anode 52 and the cathode 53 and which is effective to shunt the electrical current between the anode and cathode and which further is coupled in controlling relation relative to the valve 104;

determining, by way of the controller 122, whether the voltage and current output of the fuel cells 10 has a voltage and current output which is less than a predetermined amount;

after the step of determining the voltage and current output, adjusting the valve 104 by way of the controller 122 to terminate the flow of fuel gas 105 to the anode 52 if the voltage and current outputs is less than the predetermined amount; and shunting the electrical current by way of the controller 122 between the anode 52 and cathode 53 of the fuel cell 10 if the voltage and current outputs are less than the predetermined amount. As disclosed earlier, the method, noted above, is useful in the first operational condition where decreasing performance of the fuel cell (either as it relates to predetermined performance parameters determined in advance, or as compared to the performance parameters of other fuel cells, or otherwise), may result in damage to the fuel cell due to increasing heat accumulation or other unsatisfactory environmental conditions within the fuel cell 10.

Still further, the present invention provides a method for controlling the fuel cell 10 which has an anode 52, a cathode 53, a given voltage and current output, and a duty cycle and operating cycle, in a second operational condition which includes:

providing a supply of a fuel gas 105 in fluid flowing relation relative to the anode 52 of the fuel cell;

providing a valve 104 disposed in adjustable fluid metering relation relative to the supply of the fuel gas 105;

providing a controller 122 which is electrically coupled in current and voltage sensing relation with the anode 52 and the cathode 53 and which is effective to shunt the electrical current between the anode and the cathode of the fuel cell, and which further is coupled in controlling relation relative to the valve; and after determining the voltage and current output of the fuel cell, and with the valve being maintained in a position which insures the substantially continuous supply of fuel gas 105 to the anode of the fuel cell, periodically shunting, during the duty cycle, the current between the anode and cathode to cause a resulting increased electrical power output, and wherein the operating cycle is about 0.01 seconds to about four minutes, and wherein the duration of the shunting during the duty cycle is less than about 20% of the operating cycle.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A fuel cell having an anode and a cathode and which produces an electrical current having a voltage output, comprising:

a controller electrically coupled with the fuel cell and which shunts the electrical current between the anode and cathode of the fuel cell;

a supply of fuel gas disposed in fluid flowing relation relative to the anode of the fuel cell; and a valve disposed in fluid flowing control relative to the supply of fuel gas, and wherein the controller is coupled in controlling relation relative to the valve.

2. A fuel cell as claimed in claim 1, wherein the controller further comprises voltage and current sensors which are disposed in voltage and current sensing relation relative to the electrical power output of the fuel cell.

3. A fuel cell as claimed in claim 2, wherein the controller further comprises an electrical switch having open and closed electrical conditions, and wherein the controller upon sensing, by the voltage and current sensors, a voltage and current output of the fuel cell, adjusts the valve into a fluid metering relationship relative to the supply of fuel gas, and the electrical switch is positioned in the open or closed electrical condition, and wherein the fuel cell, in the second condition, has a duty cycle.

4. A fuel cell as claimed in claim 3, wherein the controller, in a first condition, shunts current between anode and cathode of the fuel cell when the electrical switch is in the closed electrical condition, and wherein the controller simultaneously causes the valve to terminate the supply of fuel gas to the fuel cell, and wherein the electrical switch when placed in the open electrical condition by the controller also causes the valve to be placed in a condition which allows the substantially continuous supply of fuel gas to the fuel cell.

5. A fuel cell as claimed in claim 4, wherein the controller, in a second condition, shunts current during the duty cycle between the anode and cathode of the fuel cell when the electrical switch is in the closed electrical condition, and wherein the controller maintains the valve in a condition which allows the substantially continuous delivery of the fuel gas to the fuel cell during the opening and closing of the electrical switch.

6. A fuel cell as claimed in claim 4, wherein the fuel cell has performance parameters comprising current and voltage outputs, and wherein the first condition, the voltage and current output of the fuel cell is less than the performance parameters; and wherein in the second condition, the electrical switch periodically opens and closes during the duty cycle to cause a resulting increase in the electrical power output of the fuel cell.

7. A fuel cell as claimed in claim 4, wherein the fuel cell has performance parameters comprising current and voltage outputs, and wherein in the first condition, the performance parameters are declining.

8. A fuel cell as claimed in claim 4, wherein the fuel cell has performance parameters comprising current and voltage outputs at a full rated current, and wherein in the first condition the performance parameters are declining or in a range of less than about 0.4 volts.

9. A fuel cell as claimed in claim 4, wherein the fuel cell has performance parameters comprising current and voltage outputs, and wherein in the second condition the fuel cell has an operating cycle of about 0.01 seconds to about 4 minutes, and wherein the duty and operating cycles are individually and selectively adjusted by the controller at least in part by reference to the performance parameters of the fuel cell.

10. A fuel cell as claimed in claim 4, wherein the fuel cell has performance parameters comprising current and voltage outputs, and wherein in the second condition the fuel cell has an operating cycle of about 0.01 seconds to about 4 minutes, and wherein the duty and operating cycles are individually selectively adjusted by the controller at least in part by reference to the declining performance parameters of the fuel cell in relative comparison to the performance parameters of other fuel cells.

11. A fuel cell as claimed in claim 4, wherein the fuel cell is serially electrically coupled with another fuel cell.

12. A fuel cell as claimed in claim 11, wherein in the second condition, the fuel cell has a duty cycle and an operating cycle of about 0.01 seconds to about 4 minutes, and wherein the controller is electrically coupled with each of the fuel cells to shunt electrical current during the duty cycle between the anode and cathode of each of the fuel cells, and wherein the controller shunts the individual fuel cells in a given repeating pattern.

13. A fuel cell as claimed in claim 12, wherein in the second condition, the controller which is electrically coupled with each of the fuel cells periodically shunts electrical current during the duty cycle between the anode and cathode of each of the fuel cells to achieve a resulting increased electrical power output from the serially electrically coupled fuel cells, and wherein the given repeating pattern of the controller comprises serially shunting the individual fuel cells in the repeating pattern.

14. A fuel cell as claimed in claim 13, wherein in the second condition, the duty and operating cycles are individually selectively adjusted to optimize the electrical power output of the fuel cells, and wherein the electrical power output of the serially electrically connected fuel cells increases by at least about 5 percent; and wherein the duration of the shunting during the duty cycle is less than about 20% of the operating cycle.

15. A fuel cell as claimed in claim 14, wherein the electrical switch comprises a field effect transistor, and wherein the controller which is operable to shunt the electrical current between the anode and cathode of each of the fuel cells further comprises a passive by-pass electrical circuit which operates upon failure of the field effect transistor to shunt current between the anode and cathode of each of the fuel cells.

16. A fuel cell as claimed in claim 15, wherein the passive by-pass electrical circuit comprises a diode.

17. A fuel cell having an anode and cathode and which produces electrical power having a current and voltage output, comprising:
a supply of fuel gas disposed in fluid flowing relation relative to the anode of the fuel cell;
a valve disposed in fluid flowing controlling relation relative to the supply of fuel gas to meter the fuel gas to the anode of the fuel cell; and
a controller electrically coupled with the fuel cell and disposed in controlling relation relative to the valve, and wherein the controller adjusts the valve into a given fluid metering relationship relative to the supply of fuel gas, and the controller shunts current between the anode and cathode of the fuel cell.

18. A fuel cell as claimed in claim 17, wherein the controller further comprises voltage and current sensors which are disposed in sensing relation relative to the electrical power output of the fuel cell; and an electrical switch which has open and closed electrical conditions, and wherein the controller causes the electrical switch to move between the open and closed electrical conditions.

19. A fuel cell as claimed in claim 18, wherein the controller, in a first condition, shunts current between the anode and cathode of the fuel cell when the electrical switch is in the closed electrical condition, and wherein the controller simultaneously causes the valve to terminate the supply of fuel gas to the fuel cell, and wherein the electrical switch when placed in the open electrical condition by the controller also causes the valve to be placed in a condition which allows the substantially continuous supply of fuel gas to the fuel cell.

20. A fuel cell as claimed in claim 19, wherein the controller, in a second condition, shunts current between the anode and cathode of the fuel cell when the electrical switch is placed in the closed electrical condition, and wherein the controller maintains the valve in a condition which allows the substantially continuous delivery of the fuel gas to the fuel cell during the open and closing of the electrical switch, and wherein the fuel cell in the second condition has a duty cycle.

21. A fuel cell as claimed in claim 20, wherein the fuel cell has performance parameters comprising current and voltage outputs, and wherein in the first condition, the voltage output of the fuel cell is less than the performance parameters; and wherein in the second condition, the electrical switch periodically opens and closes during the duty cycle to cause a resulting increase in the electrical power output of the fuel cell.

22. A fuel cell as claimed in claim 20, wherein the fuel cell has performance parameters comprising current and voltage outputs, and wherein in the first condition, the performance parameters are declining.

23. A fuel cell as claimed in claim 20, wherein the fuel cell has performance parameters comprising current and voltage outputs at a full rated current, and wherein in the first condition the performance parameters are declining or in a range of less than about 0.4 volts.

24. A fuel cell as claimed in claim 20, wherein the fuel cell has performance parameters comprising current and voltage outputs, and wherein in the second condition the fuel cell has an operating and duty cycle, and wherein the operating and duty cycles are individually and selectively adjusted by the controller at least in part by reference to the performance parameters of the fuel cell.

25. A fuel cell as claimed in claim 20, wherein the fuel cell has performance parameters comprising current and voltage outputs, and wherein in the second condition the fuel cell has a duty cycle, and an operating cycle of about 0.01 seconds to about 4 minutes, and wherein the operating and duty cycles are individually and selectively adjusted by the controller at least in part by reference to the declining performance parameters of the fuel cell in relative comparison to the performance parameters of other fuel cells.

26. A fuel cell as claimed in claim 20, wherein the fuel cell is serially electrically coupled with another cell.

27. A fuel cell as claimed in claim 26, wherein the controller is electrically coupled with each of the fuel cells to shunt current between the anode and cathode of each of the fuel cells.

28. A fuel cell as claimed in claim 27, wherein the fuel cell has a duty cycle and an operating cycle of 0.01 seconds to about 4 minutes, and wherein in the second condition, the controller which is coupled with each of the fuel cells periodically shunts current during the duty cycle between anode and cathode of each of the fuel cells to cause a resulting increased electrical power output from the serially electrically coupled fuel cells.

29. A fuel cell as claimed in claim 28, wherein in the second condition, the duty and operating cycles are individually selectively adjusted to optimize the electrical power output of the respective fuel cells; and wherein the electrical power output of the serially electrically connected fuel cells increases by at least about 5 percent; and wherein the duration of the shunting during the duty cycle is less than about 20% of the operating cycle.

30. A fuel cell as claimed in claim 29, and wherein the electrical switch comprises a field effect transistor, and wherein the controller which is operable to shunt current between the anode and cathode of each of the serially connected fuel cells further comprises a passive by-pass electrical circuit which operates upon failure of the field effect transistor to shunt current between the anode and cathode of each of the fuel cells.

31. A fuel cell as claimed in claim 30, and wherein the passive by-pass electrical circuit comprises a diode, and the controller is an automated intelligent controller.

32. A fuel cell having an anode, a cathode and which produces electrical current having an electrical power output, comprising:

a membrane having opposite sides, and wherein the anode is mounted on one side of the membrane, and the cathode is mounted on the side of the membrane opposite to the anode;

a supply of fuel gas disposed in fluid flowing relation relative to the anode, and a supply of an oxidant gas disposed in fluid flowing relation relative to the cathode;

voltage and current sensors which are individually electrically coupled with the anode and cathode;

a valve disposed in fluid flowing controlling relation relative to the supply of fuel gas to meter the supply of fuel gas to the fuel cell;

an electrical switch electrically coupled with the anode and cathode and which can be placed into an open and closed electrical condition;

a controller coupled with the electrical switch, valve and the voltage and current sensors, the controller upon sensing a voltage and current at the voltage and current sensors causing the valve to be adjusted into a fluid metering relationship relative to the supply of fuel gas, and the electrical switch to assume a predetermined open or closed electrical condition.

33. A fuel cell as claimed in claim 32, wherein the controller, in a first condition, shunts current between the anode and cathode of the fuel cell when the electrical switch is in the closed electrical condition, and wherein the controller simultaneously causes the valve to terminate the supply of fuel gas to the fuel cell, and wherein the electrical switch when placed in the open electrical condition by the controller causes the valve to be placed in a condition which allows the substantially continuous supply of fuel gas to the anode of the fuel cell.

34. A fuel cell as claimed in claim 33, wherein the controller, in a second condition, shunts current between the anode and cathode of the fuel cell when the electrical switch is placed in the closed electrical condition, and wherein the controller maintains the valve in a condition which allows the substantially continuous delivery of the fuel gas to the fuel cell during the open and closing of the electrical switch, and wherein the fuel cell, in the second condition, has a duty and operating cycle.

35. A fuel cell as claimed in claim 34, wherein the fuel cell has performance parameters comprising current and voltage outputs, and wherein in the first condition, the voltage output of the fuel cell is less than the performance parameters; and wherein in the second condition, the electrical switch periodically opens and closes during the duty cycle to increase the resulting electrical power output of the fuel cell.

36. A fuel cell as claimed in claim 34, wherein the fuel cell has performance parameters comprising current and voltage outputs, and wherein in the first condition, the performance parameters are declining.

37. A fuel cell as claimed in claim 34, wherein the fuel cell has performance parameters comprising current and voltage outputs at a full rated current, and wherein in the first condition the performance parameters are declining or in a range of less than about 0.4 volts.

38. A fuel cell as claimed in claim 34, wherein the fuel cell has performance parameters comprising current and voltage outputs, and wherein in the second condition the operating cycle is about 0.01 seconds to about 4 minutes, and wherein the duty and operating cycles are individually and selectively adjusted by the controller at least in part by reference to the performance parameters of the fuel cell.

39. A fuel cell as claimed in claim 34, wherein the fuel cell has performance parameters comprising current and voltage outputs, and wherein in the second condition the operating cycle is about 0.01 seconds to about 4 minutes, and wherein the duty and operating cycles are individually and selectively adjusted by the controller at least in part by reference to the declining performance parameters of the fuel cell in relative comparison to the performance parameters of other fuel cells.

40. A fuel cell as claimed in claim 34, wherein the fuel cell is serially electrically coupled with another fuel cell.

41. A fuel cell as claimed in claim 40, wherein the controller is electrically coupled with each of the fuel cells to shunt current between the anode and cathode of each of the fuel cells.

42. A fuel cell as claimed in claim 41, wherein in the second condition, the controller which is coupled with the anode and cathode of each of the fuel cells shunts current during the duty cycle between the anode and cathode of the respective fuel cells to achieve increased electrical power output from the serially electrically coupled fuel cells.

43. A fuel cell as claimed in claim 42, wherein in the second condition, the duty and operating cycles are individually and selectively adjusted to optimize the electrical power output of the respective fuel cells; and wherein the electrical power output of the serially electrically connected fuel cells increases by at least about 5%; and wherein the duration of the shunting during the duty cycle is less than about 20% of the operating cycle.

44. A fuel cell having an anode, a cathode and which produces a current having an electrical power output, comprising:

a membrane having opposite sides, and wherein the anode is mounted on one side of the membrane, and the cathode is mounted on the side of the membrane opposite to the anode;

a supply of fuel gas disposed in fluid flowing relation relative to the anode, and a supply of an oxidant gas disposed in fluid flowing relation relative to the cathode;

voltage and current sensors which are individually electrically coupled with the anode and cathode;

a valve disposed in fluid flowing controlling relation relative to the supply of fuel gas to meter the supply of fuel gas to the fuel cell;

an electrical switch electrically coupled with the anode and cathode and which can be placed into an open and closed electrical condition; and a controller coupled with the electrical switch, valve and the voltage and current sensors, the controller upon sensing a voltage and current at the voltage and current sensors causing the valve to be adjusted into a fluid metering relationship relative to the supply of fuel gas, and the electrical switch to assume an open or closed electrical condition, and wherein the controller, in a first condition, shunts current between the anode and cathode of the fuel cell when the electrical switch is in the closed electrical condition, and simultaneously causes the valve to terminate the supply of fuel gas to the anode of the fuel cell, and wherein the electrical switch when placed in the open electrical condition by the controller causes the valve to be placed in a condition which allows the substantially continuous supply of fuel gas to the anode of the fuel cell; and wherein the controller, in a second condition, shunts current between the anode and cathode of the fuel cell when the electrical switch is placed in the closed electrical condition, and simultaneously maintains the valve in a condition which allows the substantially continuous delivery of the fuel gas to the fuel cell to the anode during the opening and closing of the electrical switch.

45. A fuel cell as claimed in claim 44, wherein the fuel cell in the first and second conditions has performance parameters comprising selected current and voltage outputs, and wherein the first condition, the voltage output of the fuel cell is less than the performance parameters; and wherein the fuel cell has a duty cycle, and wherein in the second condition, the electrical switch periodically opens and closes during the duty cycle to cause a resulting increase in the electrical power output of the fuel cell.

46. A fuel cell as claimed in claim 44, wherein the fuel cell has performance parameters comprising current and voltage outputs, and wherein in the first condition, the parameters are declining.

47. A fuel cell as claimed in claim 44, wherein the fuel cell has performance parameters comprising current and voltage outputs at a full rated current, and wherein in the first condition the performance parameters are declining or in a range of less than about 0.4 volts.

48. A fuel cell as claimed in claim 44, wherein the fuel cell has performance parameters comprising selected current and voltage outputs, and wherein in the second condition the fuel cell has an operating cycle of about 0.01 seconds to about 4 minutes, and wherein the duty and operating cycles are individually and selectively adjusted by the controller at least in part by reference to the performance parameters of the fuel cell.

49. A fuel cell as claimed in claim 44, wherein the fuel cell has performance parameters comprising current and voltage outputs, and wherein in the second condition the fuel cell has an operating cycle of about 0.01 seconds to about 4 minutes, and wherein the duty and operating cycles are individually and selectively adjusted by the controller at least in part by reference to the declining performance parameters of the fuel cell in relative comparison to the performance parameters of other fuel cells, and wherein the duration of the shunting during the duty cycle is less than about 20% of the operating cycle.

50. A fuel cell as claimed in claim 44, wherein the fuel cell has a duty cycle and an operating cycle of about 0.01 seconds to about 4 minutes; and wherein the electrical power output of the serially electrically connected fuel cells increases by at least about 5%.

51. A fuel cell as claimed in claim 44, wherein the fuel cell is serially electrically coupled with another fuel cell.

52. A fuel cell as claimed in claim 44, wherein the controller is electrically coupled with the anode and cathode of each of the fuel cells to shunt current between the anode and cathode of each of the fuel cells.

53. A fuel cell as claimed in claim 44, wherein the controller which is coupled with each of the fuel cells periodically opens and closes the electrical switch to shunt current between the anode and cathode of each of the fuel cells to cause a resulting increased electrical power output from the serially electrically coupled fuel cells.

54. A fuel cell as claimed in claim 44, wherein the electrical switch comprises a field effect transistor, and wherein the controller further comprises a passive by-pass electrical circuit which operates upon failure of the field effect transistor to shunt current between the anode and cathode of each of the fuel cells.

55. A fuel cell as claimed in claim 54, wherein the by-pass electrical circuit comprises a diode.

56. A plurality of fuel cells which are serially electrically connected together and which individually produce voltage and current outputs comprising:

a membrane having opposite sides and which is made integral with each of the fuel cells, and wherein an anode is mounted on one side of the membrane, and a cathode is mounted on the side of the membrane opposite to the anode;

a supply of fuel gas disposed in fluid flowing relation relative to the anode of each of fuel cells, and a supply of an oxidant fuel disposed in fluid flowing relation relative to the cathode of each of the fuel cells;

voltage and current sensors which are individually electrically coupled with the anode and cathode of each of the fuel cells and which sense the electrical power output of each of the fuel cells;

a valve disposed in fluid flowing controlling relation relative to the supply of fuel gas to meter the supply of fuel gas to each of the fuel cells.

an electrical switch electrically coupled with the anode and cathode of each of the fuel cells and which can be placed into an open and closed electrical condition; and a controller coupled with each of the electrical switches, valves and the voltage and current sensors, the controller operable to adjust the respective valves into a fluid metering relationship relative to the supply of fuel gas, and one or more of the electrical switches to assume an open or closed electrical condition relative to one or more of the fuel cells under operational conditions, and wherein the controller, in a first operational condition, upon sensing, at one or more of the fuel cells of interest a voltage and current output at the voltage and current sensors electrically coupled with same, shunts current between the anode and cathode of the fuel cell of interest when the electrical switch is in the closed electrical condition, and wherein the controller simultaneously causes the valve which is coupled to the fuel cell of interest to terminate the supply of fuel gas to the anode of the fuel cell of interest, and wherein the electrical switch when placed in the open electrical condition by the controller causes the valve coupled to the fuel cell of interest to be placed in a condition which allows the substantially continuous supply of fuel gas to the fuel cell of interest; and wherein the controller, in a second operational condition, shunts current between the anode and cathode of the fuel cell of interest when the electrical switch is placed in the closed electrical condition, and wherein the controller maintains the valve coupled with the fuel cell of interest in a condition which allows the substantially continuous delivery of the fuel gas to the fuel cell of interest during the open and closing of the electrical switch.

57. A fuel cell as claimed in claim 56, wherein the fuel cell has a duty and operating cycle, and wherein in the first and second conditions the fuel cell has performance parameters comprising selected current and voltage outputs, and wherein in the first condition, the current and voltage outputs of the fuel cell are less than the performance parameters; and wherein in the second condition, the electrical switch periodically opens and closes during the duty cycle to increase the electrical power output of the fuel cell.

58. A fuel cell as claimed in claim 56, wherein the fuel cell has a duty and operating cycle, and wherein in the first and second conditions the fuel cell has performance parameters comprising a current and voltage output, and wherein in the first condition, the performance parameters are declining.

59. A fuel cell as claimed in claim 56, wherein the fuel cell has a duty cycle, and wherein in the first and second conditions, the fuel cell has performance parameters comprising current and voltage outputs at a full rated current, and wherein in the first condition the performance parameters are declining or in a range of less than about 0.4 volts.

60. A fuel cell as claimed in claim 56, wherein the fuel cell has a duty and operating cycle, and wherein in the first and second conditions the fuel cell has performance parameters comprising current and voltage outputs, and wherein the operating cycle is about 0.01 seconds to about 4 minutes, and wherein the duty and operating cycles are adjusted by the controller at least in part by reference to the performance parameters of the fuel cell.

61. A fuel cell as claimed in claim 56, wherein the fuel cell has a duty cycle, and wherein in the first and second conditions, the fuel cell has performance parameters comprising current and voltage outputs, and wherein in the second condition the fuel cell has an operating cycle of about 0.01 seconds to about 4 minutes, and wherein the duty cycle and operating cycle are individually and selectively adjusted by the controller at least in part by reference to the declining performance parameters of the fuel cell in relative comparison to the performance parameters of other fuel cells.

62. A fuel cell as claimed in claim 60, wherein in the second condition, the duty and operating cycles are individually selectively adjusted to optimize the electrical power output of the fuel cells, and wherein the electrical power output of the serially electrically connected fuel cells increases by at least about 5%; and wherein the duration of the shunting during the duty cycle is less than about 20% of the operating cycle.

63. A fuel cell as claimed in claim 56, wherein the electrical switch comprises a field effect transistor, and wherein the controller further comprises a passive by-pass electrical circuit which operates upon failure of the field effect transistor to shunt current between the anode and cathode of each of the fuel cells.

64. A fuel cell as claimed in claim 56, wherein the by-pass electrical circuit comprises a diode.

65. A method for controlling a fuel cell which has an anode and a cathode, and a voltage and current output, comprising:
determining the voltage and current output of the fuel cell;
shunting electrical current between the anode and cathode of the fuel cell under operational conditions;
providing a supply of a fuel gas in fluid flowing relation relative to the anode of the fuel cell;
providing a valve disposed in fluid metering relation relative to the supply of the fuel gas; and
providing a controller which is electrically coupled with the anode and the cathode and which is effective to shunt the electrical current between the anode and the cathode, and which further is coupled in controlling relation relative to the valve.

66. A method as claimed in claim 65, and wherein the fuel cell has performance parameters, and wherein in a first condition the method further comprises:
determining by way of the controller the voltage and current output of the fuel cell;
adjusting the valve, by way of the controller, to terminate the flow of the fuel gas to the anode when the voltage and current outputs of the fuel cell are less than the performance parameters; and
shunting the current between the anode and the cathode by way of the controller.

67. A method as claimed in claim 66, wherein the fuel cell has performance parameters, and wherein in a second operational condition the method further comprises:
determining, by way of the controller, the voltage and current output of the fuel cell;
supplying the fuel cell substantially continuously with the fuel gas; and
periodically shunting the current between the anode and the cathode, by way of the controller, to cause a resulting increased electrical power output of the fuel cell, and wherein the periodic shunting of the current comprises the duty cycle of the fuel cell.

68. A method as claimed in claim 67, wherein in the second operational condition the controller periodically shunts the current between the anode and the cathode during an operating cycle which is about 0.01 seconds to about four minutes in duration.

69. A method as claimed in claim 68, wherein in the second operational condition, the duration of the shunting during the duty cycle is less than about 20% of the operating cycle.

70. A method as claimed in claim 69, wherein in the second operational condition the voltage output of the fuel cell increases by at least 5%.

71. A method for controlling a fuel cell which has an anode and a cathode, and a voltage and current output, comprising:
providing a supply of a fuel gas in fluid flowing relation relative to the anode of the fuel cell;
providing a valve disposed in fluid metering relation relative to the supply of the fuel gas;
providing a controller which is electrically coupled in voltage and current sensing relation with the anode and the cathode and which is effective to shunt the electrical current between the anode and the cathode, and which further is coupled in controlling relation relative to the valve;
determining by way of the controller whether the voltage and current output of the fuel cell has a voltage and current output;

after the step of determining the voltage and current output, adjusting the valve by way of the controller to terminate the flow of fuel gas to the anode if the voltage and current output is less than a predetermined amount, and shunting the electrical current by way of the controller between the anode and cathode of the fuel cell.

72. A method for controlling a fuel cell which has an anode, a cathode, a voltage and current output, and a duty and operating cycle, comprising:

providing a supply of a fuel gas in fluid flowing relation relative to the anode of the fuel cell;

providing a valve disposed in adjustable fluid metering relation relative to the supply of the fuel gas;

providing a controller which is electrically coupled in voltage and current sensing relation with the anode and the cathode and which is effective to shunt the electrical current during the duty cycle between the anode and the cathode of the fuel cell, and which further is coupled in controlling relation relative to the valve; and after determining the voltage and current output of the fuel cell, and with the valve being maintained in a position which insures the substantially continuous supply of fuel gas to the anode of the fuel cell, periodically shunting, by way of the controller, the current between the anode and the cathode to cause a resulting increased electrical power output, and wherein the operating cycle is about 0.01 seconds to about 4 minutes, and wherein the duration of the shunting during the duty cycle is less than about 20% of the operating cycle.

73. A fuel cell having an anode, a cathode, and which produces an electrical current having a voltage output comprising:

a controller electrically coupled to the fuel cell and which periodically shunts the electrical current between the anode and cathode of the fuel cell, and wherein the fuel cell has an operating cycle and a duty cycle, and wherein the periodic shunting increases the electrical power output of the fuel cell, and the duration of the shunting during the duty cycle is less than 20% of the operating cycle.

* * * * *